United States Patent [19]

Levine

[11] Patent Number: 4,548,054

[45] Date of Patent: Oct. 22, 1985

[54] MIXING APPARATUS AND METHOD

[75] Inventor: Morris M. Levine, Scarsdale, N.Y.

[73] Assignee: CIC Int'l. Corp., New York, N.Y.

[21] Appl. No.: 587,019

[22] Filed: Mar. 7, 1984

[51] Int. Cl.[4] ............................................... A23G 9/00
[52] U.S. Cl. ........................................ 62/342; 366/203
[58] Field of Search ..................... 62/342, 68; 366/203

[56] References Cited

U.S. PATENT DOCUMENTS

| | | | |
|---|---|---|---|
| 1,846,405 | 2/1932 | Stroud | 366/203 |
| 1,946,771 | 2/1934 | Strongson | 366/203 |
| 1,968,268 | 7/1934 | Strongson | 366/203 |
| 1,982,339 | 11/1934 | Ehrgnfeld | 366/203 |
| 1,993,024 | 3/1935 | Stroud | 366/203 |
| 2,300,542 | 11/1942 | Forse | 366/203 |
| 2,662,489 | 12/1953 | Moffett, Jr. | 366/203 |
| 3,505,075 | 4/1970 | Black | 62/342 X |
| 3,952,538 | 4/1976 | Warlick | 62/342 |
| 4,448,114 | 5/1984 | Mayer | 366/318 X |

*Primary Examiner*—William E. Tapolcai
*Attorney, Agent, or Firm*—Charles E. Baxley

[57] ABSTRACT

This invention provides a safe and sanitary apparatus for blending hard ice cream (or other frozen confections) with syrups and other ingredients. The funnel holding the materials to be mixed is advanced in progressively increasing sweeps over the blending auger as the auger is rotated in clockwise and counterclockwise directions to produce a tasty and attractively marbled or blended product. A spray head and suitable automatic washing apparatus also is provided to rinse the auger and funnel surfaces.

6 Claims, 3 Drawing Figures

MIXING APPARATUS AND METHOD

BACKGROUND OF THE INVENTION

1. Field of the Invention

This invention relates to mixing machinery and methods and, more particularly, to apparatus and methods for mixing condiments and other edible matter with ice cream and similar frozen confections, and the like.

2. Prior Art Summary

Frozen confections, "hard" ice cream, and similar foods, mixed with bits of fruit, syrup, condiments and other added ingredients are very popular and are consumed by the public in large quantities. Naturally, there is a need to devise machinery to satisfy this large demand through a product in which the added ingredients are suitably marbled or in which these ingredients are well distributed within the frozen confection without, however, either homogenizing the syrup and the confection or pulverizing particulate edible matter within the added ingredients. This mixing may be performed after the confection has been frozen in order to produce the visually pleasing and tasty streaks of syrup, fruit, and the like throughout the body of the confectionary product.

There are a number of problems, however, in mixing, or perhaps, blending the usually viscous and sticky syrups, fruit particles, nuts and other ingredients with a mass of hard, frozen confection. There is a further group of problems that mature from the need to keep the confection in a frozen condition during the mixing operation in order to preserve its freshness and taste as well as to avoid ice formation within the confection if the confection should soften, or melt, and thus make it necessary to refreeze the product.

These, as well as many other difficulties that have characterized the prior art have been the subject of a number of proposed solutions. The following patents are illustrative of some of these proposals.

U.S. Pat. No. 1,846,405 granted Feb. 23, 1932 to W. A. Stroud for "Drink Mixer" shows a motor driven agitator that protrudes into a container which is automatically raised and lowered relative to the agitator, when the agitator is energized.

U.S. Pat. No. 1,946,771 granted Feb. 13, 1934 to H. L. Strongson for "Automatically Timed Drink Mixer" shows an agitator within a cup in which the cup is gradually separated from the agitator as the mixing operation proceeds.

U.S. Pat. No. 1,982,339 granted Nov. 27, 1934 to T. R. Ehrenfeld for "Switch" shows a container that is moved slowly in an upward direction relative to the mixing element and rapidly in a relative downward direction.

U.S. Pat. No. 2,300,542 granted Nov. 3, 1942 to H. D. Forse for "Automatic Fountain Mixer" discloses an apparatus in which the mixing duration is automatically timed and the mixing vessel is lowered from the mixing element as the cycle is complete.

U.S. Pat. No. 3,742,724 granted July 3, 1973 to P. Carpigiani for "Ice Cream Machine" shows an ice cream freezer in which an extrusion mechanism is enclosed within a freezer coil.

U.S. Pat. No. 3,952,538 granted Apr. 27, 1976 to S. W. Warlick for "Portable Self-Contained Apparatus for Freezing Liquids" discloses a device in which the liquid container is rotated relative to the dasher.

U.S. Pat. No. 4,061,275 granted Dec. 6, 1977 to F. W. Herfeld for "Continuous Mixing Apparatus, Especially a Cooling Mixer and a Method for Producing Granulated Material" shows an apparatus for discharging uniformly compounded mixtures of batched input materials.

None of these patents, however, suggest a technique for combining syrups, fruit particles and other confections with hard ice cream or other frozen confections while it is in the frozen state to produce an attractively marbled or carefully blended product with chunks of condiments, and maintain hard ice cream.

Many other technical problems also must be solved for a mixing machine to be a truly satisfactory device. A machine of this nature must be able not only to process commercially significant quantities of product, but it also must be capable of being cleaned swiftly and thoroughly as well as being safe to operate.

These and other problems that have characterized the prior art are overcome, to a large extent, through the practice of the invention. A typical embodiment of the invention has auger, or Archimedes' Screw that is rotated about its longitudinal axis. A double-walled hopper in which refrigerating coils are encased between the hopper walls is moved in the longitudinal direction to engage the condiments with the hopper with the rotating auger. The auger makes the ice cream and condiments turn and twist as the auger rotates first in one direction, then in the opposite direction and so on while the condiment mixes with the ice cream. The refrigerating coils, interposed between the inner and outer hopper walls, moreover, continuously refrigerate the product that is being processed within the hopper to maintain the ice cream hardness.

To prevent intermixing of flavors, a spray head is mounted on the apparatus close to the auger and the hopper when the hopper is telescoped over the auger. The spray head is thus enabled to direct a flow of water over the residue of ice cream and condiments on the contacting parts of the apparatus in order to swiftly cleanse the device and to prepare it to process the next order of condiment and ice cream.

Thus, there is provided in accordance with the invention, an apparatus for mixing syrups, nuts, fruit particles and the like with hard ice cream to produce an attractively marbled or uniformly blended and tasty product. The apparatus is, in this respect, a sanitary, easily and swiftly cleaned device and one in which specific provision is made for operator safety. In this respect, operator safety is achieved through the electrical circuit that requires the operator to continuously manipulate two switches during the time needed to raise the hopper to the auger. In this manner, the operator's hands must be positioned in a safe orientation relative to the moving parts of the apparatus, or all motion will stop.

These and other features of the invention are presented in more complete detail in the following description of a typical embodiment of the invention when taken with the figures of the drawings. The scope of the invention, however, is limited only through the appended claims.

DETAILED DESCRIPTION OF PREFERRED EMBODIMENTS

Figure 1:
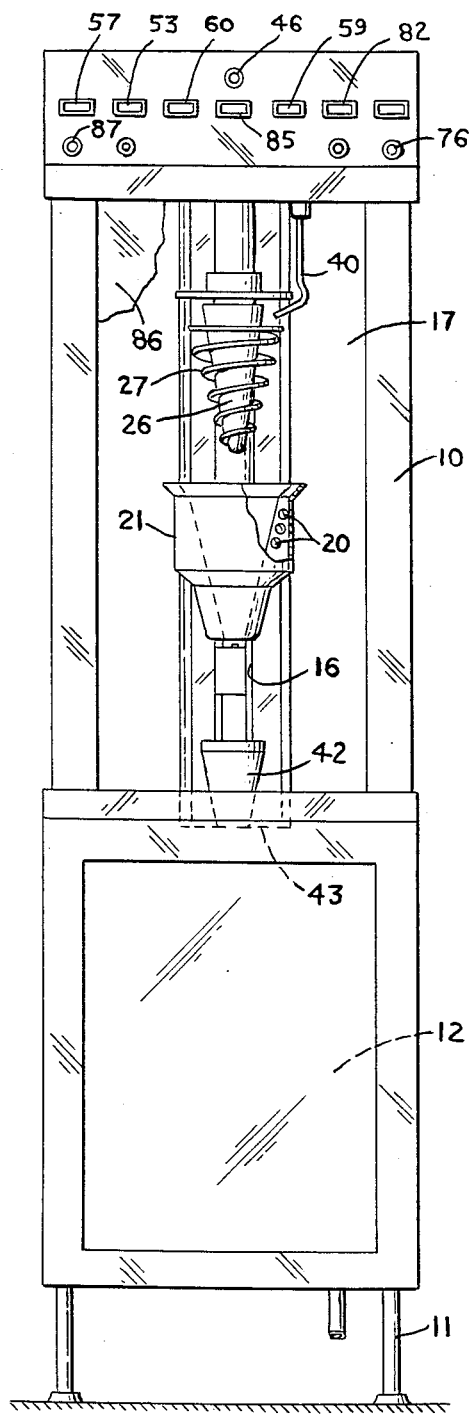
FIG. 1 is a front elevation of a typical embodiment of the invention.

For a more detailed understanding of the invention, attention is invited to FIG. 1 which shows a generally rectangular frame 10 standing on legs 11. A refrigerator compressor and condenser assembly 12 (FIG. 2) is supported in the frame 10 immediately above the legs 11 in order to provide refrigeration for ice cream that is being processed as described subsequently. Refrigerant, of which Freon-12 (FR-12) is typical, flows from the condenser assembly 12 through flexible tubing 13 to a vertically moveable refrigeration assembly 14.

The vertical motion of the refrigeration assembly 14 is controlled by means of a sliding Teflon guide 15 that is mounted in a slot 16 (FIG. 1) that is formed in a panel 17 which is secured to the frame 10 above the condenser assembly 12. Not shown in the drawing, the coolant flows through a conduit in the refrigeration assembly 14 to a cooling coil 20 which is mounted between the walls of a hopper, or funnel 21, by way of a funnel block (not shown) that joins the funnel to the refrigeration assembly 14. Coolant, flowing through the coil 20 is returned to the condenser 12 (FIG. 2) by way of the funnel block, the refrigeration assembly 14 and a flexible hose 22.

It will be recalled that the refrigeration assembly 14 is vertically moveable, just as the funnel 21 (FIG. 1) and the funnel block to which it is attached also are vertically moveable. This vertical motion is imparted to the funnel 21 through a gear motor with a brake, which includes a rack 23 that is rigidly secured to the frame 10 and a meshing pinion gear 24. To drive the pinion gear 24, and the refrigeration assembly 14 to which the gear is attached, an electrical funnel motor 25 is provided to drive the gear.

As illustrated in FIG. 1 an auger 26 that has a single helical thread 27 is mounted near the top of the frame 10 with the apex of the helix oriented toward the open top or inlet of the funnel 21. Although the auger 26 does not move in a vertical direction it is, nevertheless, supported on the frame 10 for rotation in clockwise and counterclockwise directions by means of a vertical shaft 30 (FIG. 2), the lower end of which is secured to the auger 26 (FIG. 1) and the top end of which is sustained in a bearing 31 that is rigidly fixed in a horizontally disposed plate 32 which, in turn is mounted on the frame 10 in correct relative orientation by means of standoffs 33.

Figure 2:
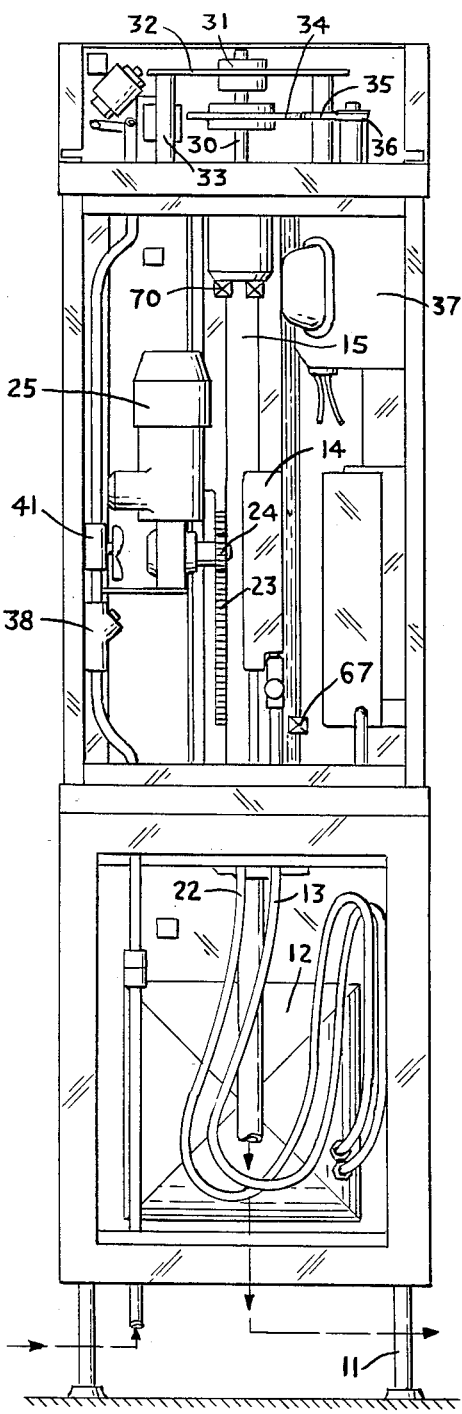
FIG. 2 is a rear elevation of the entire apparatus, a portion of which is shown in FIG. 1.

Between the bearing 31 and the auger 26 (FIG. 1) and as illustrated in FIG. 2, a large auger gear 34 also is rigidly affixed to the shaft 30 in order to rotate with the shaft. The large auger gear 34 is driven by means of a toothed belt 35 that also meshes with a small auger gear 36 in order to rotate the auger at a speed of about 350 revolutions per minute. Power for the small auger gear 36, which, in turn drives the auger 26 that is shown in FIG. 1 through a train that includes the belt 35, the large auger gear 34 and the shaft 30 at a speed of about 350 revolutions per minute is provided by an auger motor 37 that also is fastened to the frame 10.

Tap water for equipment washing purposes is supplied to a spray head 40 (FIG. 1) that discharges this water at the maximum diameter of the helical thread 27. The water for the spray head 40 flows, as shown in FIG. 2 through a tube that traverses almost the entire vertical length of the frame 10 from the legs 11 and through a manual valve 41 and a solenoid valve 38 to the spray head.

Turning once more to FIG. 1, the discharge from the funnel 21 is oriented in longitudinal and axial alignment with a cup holder 42 that is mounted in a sink 43 that receives spent wash water, spilled ice cream and the like.

Figure 3:
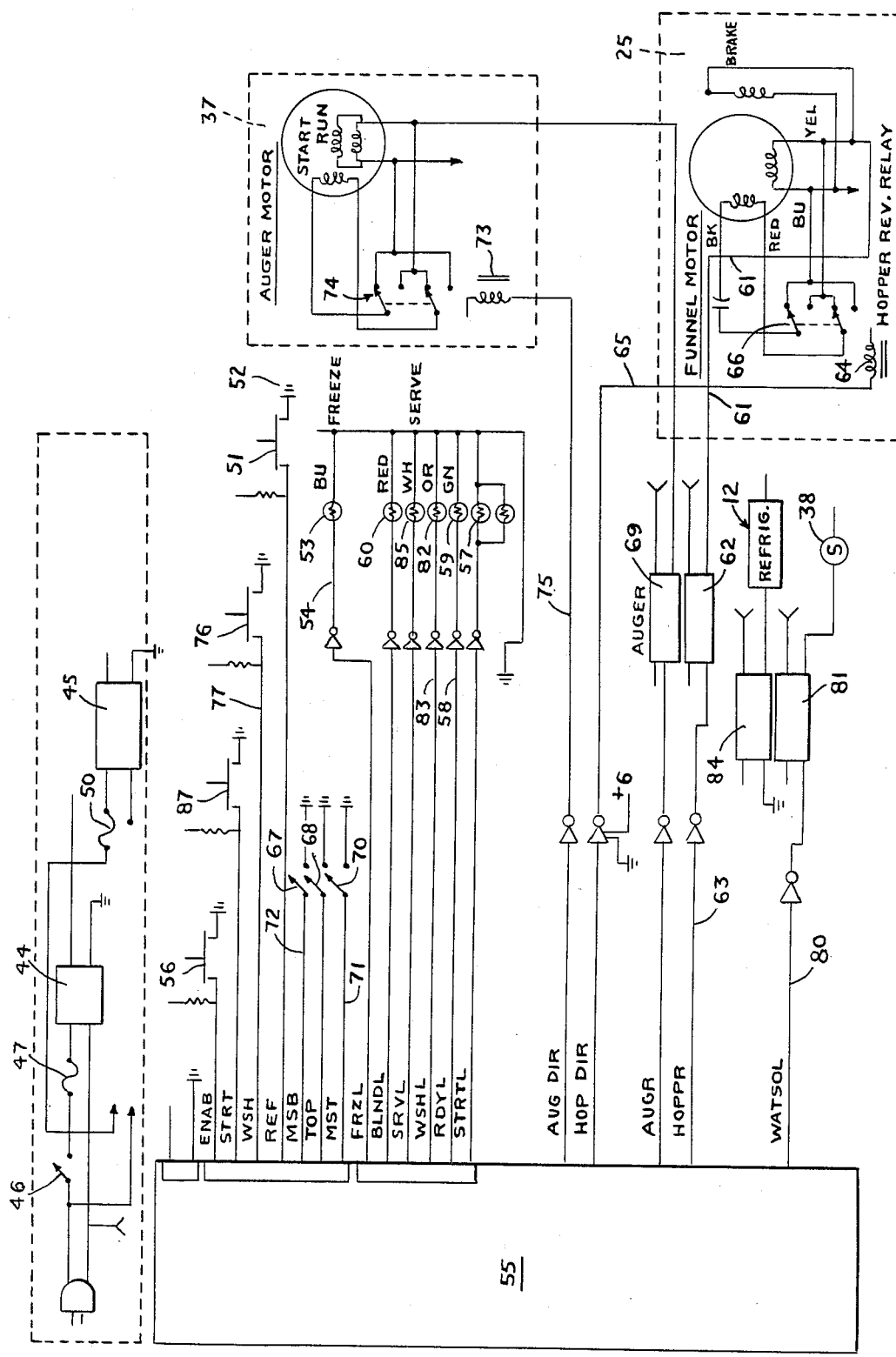
FIG. 3 is a wiring diagram for the electrical circuit associated with the apparatus shown in FIGS. 1 and 2.

Although a hydraulic system is preferred for operating the dispenser apparatus because of the greater reliability and longer apparatus life that it will provide, an electrical circuit is described herein because it is this electrical circuit that actually was developed at the time of filing the instant application. Accordingly, attention is invited to FIG. 3 which shows a five-volt power supply 44 and a six-volt power supply 45 to provide appropriate voltage levels in the balance of the circuit, as required. Basically the circuit shown in FIG. 3 provides a number of functional results:

a. Drives the auger motor in clockwise and counterclockwise directions;

b. Drives the funnel in longitudinal directions;

c. Activates and deactivates a solenoid valve for the water spray apparatus; and d. Activates and deactivates the refrigeration mechanism through the operation of the power switch.

The circuit shown in FIG. 3 also provides a number of additional functions, of which energizing lamps to indicate the operational status of the apparatus, to be later described in more complete detail, is typical. Thus, the circuit is energized by closing a main switch 46 to supply line voltage to the power supplies 44, 45 through fuses 47, 50, respectively.

The refrigeration equipment is energized next by operating a switch 51 to complete the circuit through to ground 52 for the refrigerator compressor and condenser assembly 12 (FIG. 2). In addition to starting the refrigeration cycle, a "freeze" lamp 53 also is energized through a conductor 54.

The machine is controlled by a microprocessor system 55 that functions as a universal logic and timing unit configured to this application by the software contained in an EPROM chip which is plugged into the microprocessor board.

There are two power supplies. A five-volt supply 44 that energizes the microprocessor and the six volt supply 45 that energizes the lamps and relays as described subsequently in more complete detail.

The microprocessor 55 receives input signals from three pushbutton switches on the control panel and from three micro switches inside the machine as follows:

A spring biased enable, or first start switch 56 must be held manually in a closed circuit condition when the funnel 21 is down in addition to either a manually operated, spring biased start switch 87 or a spring biased wash switch 76 to insure, for safety purposes, that both of the operator's hands are occupied and kept away from moving parts. Enabling or activating the switches 56 and 76, for example, in the foregoing manner starts the mixing process. After mixing is completed, the funnel 21 is up and the components in contact with the foodstuffs are washed automatically in response to a command from the microprocessor 55. When the funnel 21 is down, wash is started manually by manipulating the switches 56 and 76. A bottom limit micro switch-closure 67 signals the microprocessor 55 that the funnel 21 is at the bottom and the motor 25 must be stopped. A top limit micro switch 70, when closed, signals the microprocessor 55 that the funnel 21 is near the top and to stop the motor 25. Space is left to allow the funnel 21 to coast to prevent the funnel from crashing into a stop.

After stopping the funnel 21 near to the auger 26, the microprocessor 55 can jog the funnel until a top switch 68 (FIG. 3) closes at which point the funnel is completely up.

Both of the power supplies 44,45 are controlled by a power switch 46. In addition, funnel and auger motor relays 62,69 and water relay 81 are in series with the switch 46 so that in the event of relay failure powering down will stop the machine. The refrigeration is controlled by a solid-state relay 84 that is activated when the 6 volt supply 45 is energized. Thus, this refrigeration load is not controlled through the power switch 46. A safety hazard is not created by energizing the refrigeration relay 84 to start the refrigeration, and for this reason the refrigeration relay is not in circuit with the power switch 46.

In operation, upon energizing the circuit, the microprocessor 55 registers the status of the bottom limit switch 67 for the funnel 21 in the down position and moves the funnel to the bottom, if necessary. The ready lamp 59 and freeze lamp 53 are then turned on by the microprocessor 55. All machine operations are the result of a low-power signal from the microprocessor 55 which activates a specific one of the relays and an interface chip (not shown in the drawing) to control the desired feature of device operation. The operator then loads the lowered funnel 21 with ice cream and condiments, or material to be blended, and manually keeps the enable and start switches 56 and 87, respectively, operated. The ready light 59 is extinguished and two start lamps 57 come on until the funnel 21 has fully risen, at which point the operator may release the switches 56 and 87. The start lamps 57 then are extinguished and a blend lamp 60 comes on. The machine goes through the blend cycle and when complete, the blend light 60 is turned off and a serve lamp 85 is turned on, at which point the operator can remove the blended ice cream and give it to the customer.

The operator then activates a wash switch 76 to start an automatic rinse cycle. The blend and freeze lights 60, 53 are extinguished and wash light 82 is illuminated. When the wash cycle is complete, the funnel 21 is lowered and the wash light 82 turns off. At the same time, the ready freeze lights 59,53 are illuminated and the machine is ready for the next cycle. If desired, a rinse, or wash, can be undertaken at any time by activating the enable and wash switches 56, 76 until the funnel 21 rises to the top of the apparatus. If the enable switch 56 or the start or wash switches 87,76 are released before funnel 21 has fully risen, the funnel stops, reverses direction and goes down to prematurely terminate the cycle without blending the ice cream.

Thus operating the refrigeration switch 51 completes a circuit to the common ground 52 that not only energizes the compressor and condenser assembly 12 but also completes the circuit for the freezer lamp 53.

To initiate vertical motion for the funnel, or hopper 21 (FIG. 1) and rotation of the auger 26, as mentioned above, the start switch 56 and the start or wash switch 76 are operated to complete the circuits through the microprocessor 55 to illuminate a start lamp 57, a blend lamp 60 and to energize the funnel motor 25 and the auger motor 37. As shown in FIG. 3, power is supplied to the funnel motor 25 through a conductor 61 that couples the funnel motor 25 to the six-volt power supply 45 through a relay switch 62 that is energized, in turn, by means of a signal from the microprocessor 55 in a conductor 63. It will be recalled that the funnel motor 25 is connected to run, selectively, in opposite directions, depending on the appropriate longitudinal direction in which the funnel 21 (FIG. 1) is to move.

To provide this direction control, a motor reversing relay 64 is provided in circuit with the microprocessor 55 through a conductor 65. As shown, the funnel motor reversing relay 64 changes the direction of the motor rotation by operating ganged pairs of electrical contacts 66 that reverse the direction of the electrical current in the motor's windings as the funnel 21 (FIG. 1) operates limit switches 67, 70 (FIGS. 2 and 3) at the extremes of the funnel's longitudinal travel. In this way, as the extremes of permissible funnel travel are reached, the appropriate one of the limit switches 67,70 is operated to energize the reversing relay 64 that shifts the contacts 66 and causes the current in the windings of the motor to reverse and thereby change the direction of the motor's rotation. Illustratively, when the funnel 21 is at its lowest point, the switch 67 is operated to complete a circuit from the common ground through the switch 67, a conductor 72 (FIG. 3), the microprocessor 55 and the conductor 65. Similarly, at the top of the funnel's travel, the switch 70 is operated to complete a circuit to the reversing relay 64 through a path that includes the common ground, the switch 70, a conductor 71, the microprocessor 55 and the conductor 65.

The direction of the auger motor 37 rotation, and hence, the rotational direction of the auger 26 (FIG. 1) also is controlled through appropriate energization of a motor reversing relay 73 that operates a pair of ganged electrical contacts 74 to reverse the direction of the electrical current through the windings of the motor. This signal, to reverse auger rotation direction, is supplied to the reversing relay 73 through a conductor 75 that is connected to the microprocessor.

Recall that the solenoid valve 38 (FIG. 2) initiates and terminates a wash cycle for the auger 26 (FIG. 1) and the funnel 21 by permitting tap water to flow from the spray head 40. As illustrated in FIG. 3, the wash switch 76 is operated to complete the circuit through to the common ground from the microprocessor 55 by way of a conductor 77. Activating the wash cycle in the foregoing manner compels the microprocessor 55 to respond in several ways. The microprocessor 55, for example, sends a signal through a conductor 80 to energize a relay 81 which, in turn, couples the winding of the relay (not shown in the drawing) in the solenoid valve 38 to the six-volt power supply 45. So energized, the solenoid valve 38 is opened to permit wash water to discharge from the spray head 40 (FIG. 1) and clean the auger 26 and the funnel 21 of any residual flavors from the previously blended charge of ice cream and condiments. The waste wash water, moreover, is discharged from the funnel 21 and is collected in the sink 43 for ultimate disposal through the sewage system.

Initiating the wash cycle in the foregoing manner also causes the microprocessor 55 (FIG. 3) to energize a wash cycle lamp 82 through a conductor 83.

In operation, the funnel 21 (FIG. 1) is at its lowest point of travel. In this circumstance, and as illustrated in FIG. 3, the main switch 46 is closed to establish circuit continuity for the power supplies 44,45. The start switch 56 and either the wash switch 76 or start switch 87 are jointly and continuously activated to energize the mixing apparatus. The refrigerator switch 51 also is operated to energize the compressor and condenser assembly 12 by activating the relay 84 to apply six volt power from the supply 45 to the compressor motor. The energized compressor and condenser assembly 12 then lowers the temperature of the coolant in the refrigeration system so that the coolant, flowing in a closed cycle from the assembly 12 (FIGS. 1 and 2) through the flexible tube 13, the refrigeration assembly 14, the cooling coil 20 in the funnel 21 and back through the refrigeration assembly 14 and the hose 22 to the compressor and condenser assembly reduces the temperature within the funnel 21 to a level at which hard ice cream will remain in a frozen state.

At this point in the operation of the apparatus, the microprocessor 55 causes the freeze lamp 53 to glow, the start lamps 57 already having been in an illuminated status.

The operation of this apparatus, as regulated through the microprocessor 55 can be divided into a "main program" and a number of "subroutines". Thus, after a charge of hard ice cream and the condiments that are to be mixed with the ice cream are deposited in the now refrigerated funnel 21 (FIGS. 1 and 2), the funnel motor 25 is energized to drive the pinion gear 24, the refrigeration assembly 14 and the funnel up to the point at which the auger 26 presses into the frozen confection. At this point, the microprocessor 55 also activates the auger motor 37 to rotate the auger 26. Through the microprocessor 55, the rotation of the auger 26 is controlled in a timed relationship to the rise and fall of the funnel 21 plus the refrigeration of the funnel to produce a blend of condiments in a desirably hard ice cream without blending them into a whipped form which develops a soft ice cream and pulverizes the condiments. As previously mentioned, after stopping the funnel 21 at the auger 26, the microprocessor 55 can jog the funnel 21 until the top limit switch 70 is operated, at which point the funnel has reached the top of its travel with the funnel completely telescoped over the auger.

During this portion of the operation of the apparatus the ready lamp 59 is extinguished and the two start lamps 57, and the blend lamp 60 all are illuminated, again through the circuit response of the microprocessor 55. When the blending process is complete, however, the blend lamp 60 is turned off and a serve lamp 85 is illuminated to inform the serving personnel that the now blended and refrigerated contents of the funnel 21 now can be removed for consumption. The microprocessor 55 now activates once more the funnel reversing relay 66 (FIG. 3) in order to lower the funnel 21 (FIG. 1) to the lower limit of its travel whereupon the lower limit switch 67 is tripped to complete the blend and serve portions of the cycle of operation.

Should it be desired to wash the funnel 21 and the auger 26 at this point to remove traces of the preceding blend flavors, the wash switch 76 is operated to complete the circuit to ground. This action causes the microprocessor to turn off the ready lamp 59, the serve lamp 85 and the freeze lamp 53. The funnel motor 25, moreover, is energized to raise the funnel 21 until it telescopes over the auger 26. The microprocessor 55 also activates the solenoid valve 38 in the tap water conduit to permit this water to discharge from the spray head 40 and thereby to cleanse the interior cup of the funnel 21 and the adjacent surface of the auger 26. The rinse or wash water from the spray head 40 is discharged from the apparatus by way of the sink 43. After a predetermined time, the solenoid valve 38 is deactivated to terminate flow from the spray head 40 and the auger motor 37 is temporarily activated to "spin dry" the auger 26. In this way, the apparatus is now made ready to process a fresh charge of frozen confection and condiment, or mixing ingredient.

The microprocessor 55 also is provided with a safety scan subroutine for added safety and protection. Thus, if either the start switch 87 or the wash switch 76 is not closed steadily to initiate a blending operation simultaneously and continuously with the continued activation of the enable/start switch 56, the apparatus will not function.

Thus there is provided in accordance with the principles of the invention an apparatus that blends one or more condiments with hard ice cream or other frozen confection to produce an attractively marbled and tasty product in a manner that is safe, sanitary and inexpensive.

I claim:

1. An apparatus for blending hard ice cream with at least one condiment comprising a refrigerating compressor and condenser assembly, a funnel for holding the ice cream and condiment therein, a cooling coil in thermal communication with said funnel, said coil being coupled to said refrigerating assembly for freezing the ice cream therein, a funnel motor coupled to said funnel for moving said funnel in linear directions, an auger in alignment with said funnel to be telescoped therewithin during said linear funnel movement, an auger motor for rotating said auger in clockwise and counterclockwise direction, and an electrical circuit for progressively advancing said funnel over said auger as said auger is being rotated until said funnel is telescoped over said auger, said electrical circuit including means connecting with said auger motor and said funnel motor for activating said auger motor and said funnel motor to impart translatory motion to said funnel and reciprocating rotational motion to said auger, said apparatus further comprising a spray head spaced from said auger, a water conduit establishing fluid communication with said spray head and a solenoid valve in said conduit for selectively interrupting said fluid communication therethrough in order to wash said auger and said funnel.

2. An apparatus for blending hard ice cream with at least one condiment comprising a refrigerating compressor and condenser assembly, a funnel for holding the ice cream and condiment therein, a cooling coil in thermal communication with said funnel, said coil being coupled to said refrigerating assembly for freezing the ice cream therein, a funnel motor coupled to said funnel for moving said funnel in linear directions, an auger in alignment with said funnel to be telescoped therewithin during said linear funnel movement, an auger motor for rotating said auger in clockwise and counterclockwise direction, and an electrical circuit for progressively advancing said funnel over said auger as said auger is being rotated until said funnel is telescoped over said auger, said electrical circuit including means connecting with said auger motor and said funnel motor for activating said auger motor and said funnel motor to impart translatory motion to said funnel and reciprocating rotational motion to said auger, said apparatus further comprising a funnel motor reversing relay and an auger motor reversing relay for reversing the directions, respectively, of said funnel and said auger rotation.

3. An apparatus for blending hard ice cream with at least one condiment comprising a refrigerating compressor and condenser assembly, a funnel for holding the ice cream and condiment therein, a cooling coil in thermal communication with said funnel, said coil being coupled to said refrigerating assembly for freezing the ice cream therein, a funnel motor coupled to said funnel for moving said funnel in linear directions, an auger in alignment with said funnel to be telescoped therewithin during said linear funnel movement, an auger motor for rotating said auger in clockwise and counterclockwise direction, and an electrical circuit for progressively advancing said funnel over said auger as said auger is being rotated until said funnel is telescoped over said auger, said electrical circuit including means connecting with said auger motor and said funnel motor for activating said auger motor and said funnel motor to impart translatory motion to said funnel and reciprocating rotational motion to said auger, said apparatus further comprising at least two switches for continuous activation for energizing said funnel motor and said auger motor.

4. An apparatus according to claim 1 further comprising a plurality of lamps, each for indicating a specific status of the apparatus.

5. An apparatus according to claim 2 further comprising a meshing rack and pinion gear, said pinion gear being connected to said funnel motor in order to move said funnel along the length of said rack.

6. An apparatus according to claim 5 further comprising a shaft connected on one end thereof to said auger, a large auger gear fixed to said shaft, a small auger gear fixed to said auger motor and a belt coupling said large and small auger gears in order to rotate said auger in clockwise and counterclockwise directions.

* * * * *